Oct. 13, 1959  P. N. ADAMS  2,908,061
PIPE CLAMP DEVICE
Filed Nov. 15, 1957
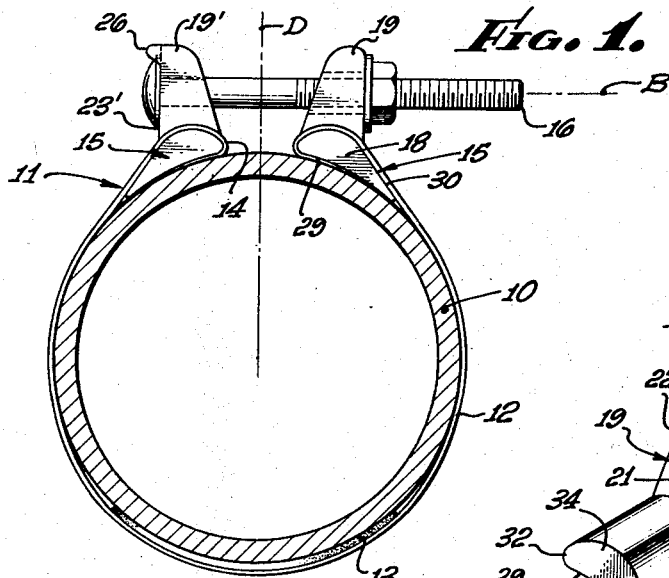
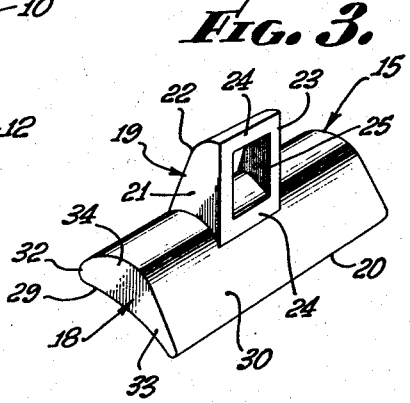
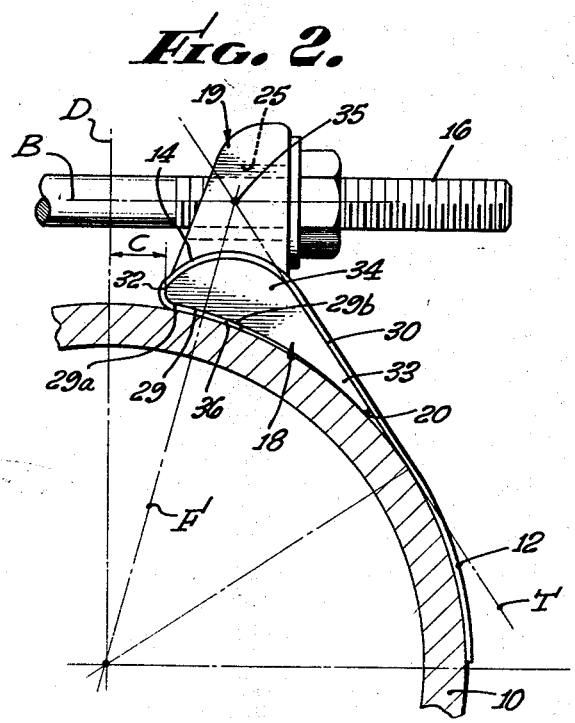
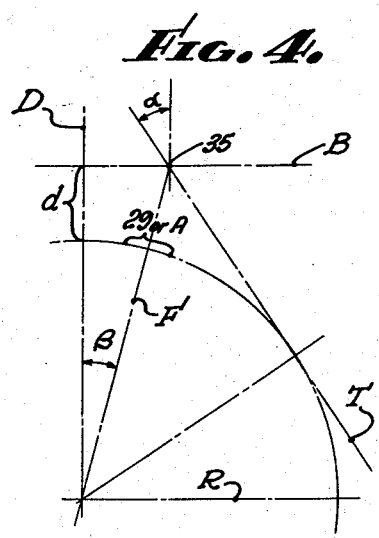
INVENTOR.
PHILIP N. ADAMS,
BY
ATTORNEYS.

United States Patent Office 2,908,061
Patented Oct. 13, 1959

2,908,061

PIPE CLAMP DEVICE

Philip N. Adams, West Covina, Calif., assignor to Adams Pipe Repair Products, El Monte, Calif., a corporation of California Application November 15, 1957, Serial No. 696,837

5 Claims. (Cl. 24—279)

This invention relates to a pipe clamp device of flexible band type and more particularly to a novel construction of a pipe clamp member or lug utilized with such a device and for providing uniform distribution of pressure forces transmitted to a pipe or conduit on which the pipe clamp device is installed.

Prior proposed clamp devices of flexible band type have included a clamp member or lug for each end of the band and bolt means interconnecting juxtaposed clamp members for tightly drawing the band about a pipe for sealing of a leak or break therein. Each end portion of such a band was either passed under the clamp member and then bent outwardly thereover for securement thereto or passed over the clamp member and then infolded thereunder. In the former instance the end extremity of the band was secured in a slit provided in the front edge face of a clamp member (see Patents 2,599,882 and 2,713,352). In the latter instance the end extremity of the band was wrapped about the leading edge of the clamp lug and positioned between the bottom surface of the clamp member and the pipe surface (see Patent 2,213,022).

Installation of such prior proposed devices, during which the band was drawn tightly about a pipe by tightening of bolt assemblies, was attendant with several disadvantages which include: (1) non-effective securement of the band extremities so that under applied tightening forces ends of the bands would pull out of the securement slits in the clamp member; (2) slippage of the bands on the pipe surface was unduly restricted or limited during tightening; (3) pressure forces produced during tightening were non-uniformly distributed and transmitted to a pipe surface; (4) such non-uniform pressure often resulting in nosing-over of the leading edge of the clamp member and thus provided an unstable clamp which tended to bite or press into the pipe. Such disadvantages arose primarily out of the shape and construction of the clamp member and proper installation of such prior proposed clamping devices to provide an effective efficient seal required great care.

This invention relates to a pipe clamp device utilizing a flexilble band or strap in which inturned loop-like band end portions substantially enclose a clamp member by first passing over the outwardly directed surface of the clamp and then terminating beneath the member and extending over a predetermined bottom pressure area and then terminating in spaced relation to the pipe-encircling portion of the band. The clamp member of this invention is so constructed that disadvantages of the prior devices are obviated and the forces acting upon the pipe device, namely: the band or strap force, bolt tightening force, and pressure forces imparted to the pipe by the bolt, are so related that a minimum of uniformly distributed pressure is imposed on the pipe beneath the clamp member so as to effect proper sealing. Thus, the clamp member of this invention, while being installed on a pipe by tighhtening-of-the-bolt assemblies or means, will not nose-over into the pipe, the band or strap will be uniformly tightened and will move relatively readily with respect to the pipe surface so as to effectively draw the strap about the pipe in sealing and tight relation thereto. Moreover, the band and the enclosed clamp member at each end thereof maintain substantially a predetermined assembled relationship without tearing or deforming of the metal of the band.

The primary object of this invention, therefore, is to disclose and provide a novel pipe clamp device which produces an improved result over prior proposed clamp devices.

An object of this invention is to disclose and provide a novel clamp member for use with a clamp device of flexible band type.

Another object of this invention is to disclose and provide a clamp member constructed in such a manner that pressure forces created during installation of the device are uniformly distributed and transmitted to a pipe surface.

A further object of this invention is to disclose and provide a pipe clamp device provided with a clamp member so constructed and arranged that during tightening, the clamp member is prevented from turning about its leading edge to nose-over or bite into the pipe surface.

A further object of this invention is to disclose a pipe clamp device which may be readily and effectively installed on a pipe and which provides improved sealing relation to the pipe and with resultant longer life to the repaired pipe.

Generally speaking, this invention contemplates a pipe clamp device comprising a flexible strap having strap end portions provided with loops to enclose associated clamp members adapted to be juxtaposed in close spaced relation when installed. Each clamp member includes an elongated base portion and an upstanding boss portion extending through an opening provided therefor in the strap end portion. The base portion includes a bottom pressure transmitting, slightly concave surface covered by the strap end portion and an outwardly facing strap force directing surface. The strap force directing surface lies in a plane tangent to an associated pipe surface, and when upwardly projected, intersects the axis of the tightening bolt assembly rearwardly of the leading edge of the base portion. The pressure transmitting surface is provided with a width, the center line of which lies in a plane defined by the axis of the associated pipe and the intersection of the projected strap force directing surface with the bolt axis. As a result of such interrelationship of the strap force directing surface, bolt axis and pressure transmitting surface, forces imparted to the pipe device by tightening of the bolt assembly are uniformly distributed along the pressure transmitting surface so that the clamp member and end portions of the strap may be drawn toward each other without producing undesired, unbalanced forces in the associated pipe.

Many other objects and advantages in this invention will be readily apparent from the following description of the drawings in which an assembly embodiment of this invention is shown.

In the drawings:

Fig. 1 is a sectional view through a pipe on which a pipe repair device of this invention is installed, an end view of the installed device being shown.

Fig. 2 is an enlarged quadrant sectional view taken in the same transverse plane as that of Fig. 1.

Fig. 3 is a perspective view of a clamp member embodying this invention and used in the device shown in Fig. 1.

Fig. 4 is a schematic view of forces acting on the device of Fig. 1.

In Fig. 1 of the drawings, there is shown a cylindrical pipe or conduit for conveying fluids. Installed on pipe 10 is a pipe repair device 11 embodying this invention and constructed and arranged to effectively seal a leak or break in pipe 10.

In general, pipe repair device 11 comprises a flexible longitudinally non-stretchable band or strap 12 of uniform width and made of a selected non-corrosive, rust-resistant metal material and adapted to substantially encircle pipe 10. The internal surface of strap 12 may have bonded thereto a resilient gasket member 13 of selected length and width for covering a break in the pipe, the member 13 resiliently conforming to surface irregularities in the pipe surface. Each end portion of strap 12 may be formed into an inturned ported loop 14 which encloses a clamp member or lug 15 embodying this invention. When installed about a pipe 10, the clamp members 15 are positioned in juxtaposed spaced relation and bolt 16 extending between and interconnecting the clamp members 15 serve to draw the strap end portions toward each other and to tightly secure the device on the pipe in sealing relation therewith. Only one clamp member 15 will be described in detail since the other clamp member is essentially of the same construction.

This invention is particularly directed to the construction of clamp member 15 which comprises an integral cast body provided with an elongated base portion 18 and an upstanding bolt boss portion 19 provided centrally between ends of the base portion to extend through the port in loop 14 and in spaced relation to trailing edge 20 of the base portion 18. The boss portion 19 includes spaced upstanding side walls 21 having upwardly and rearwardly curved top edges 22. A rear or back surface 23 of boss portion 19 may be provided by vertical back edges of side wall 21 and by transversely extending portions 24 which define with the edges of the side walls a port or opening 25 for reception therethrough of bolt 16. When installed, the clamp member 15 is so designed that back surface 23 of the boss portion lies in a plane parallel to a diametrical plane D. In this example, such diametrical plane D is indicated as a vertical plane lying midway between the spaced juxtaposed clamp members 15. Thus, the back surface 23 and the port 25 define positioning means for bolt 16 so that when the head of a bolt or a nut and washer assembly of a bolt is seated against back surface 23, the axis B of the bolt will lie virtually at right angles to the diametrical plane D.

It will be understood that the boss portion 19' of the other clamp member 15 may not be provided with a port 25, but instead may be provided with a slot having a top opening so that one end of the bolt may be readily slipped downwardly into the slot for positioning of the bolt. In the latter bolt boss portion, back surfaces 23' are provided in the same relation as those back surfaces 23 described above, but instead of a transverse wall section 24 being provided, the side walls 21 of the boss portion may be provided with rearwardly extending top hook portions 26 to retain the bolt against outward movement which might cause disassembly thereof.

It may be further noted that the bolt axis B passes through the boss portions 19, 19' in spaced relation to a tangent plane to pipe 10 at the intersection of the diametrical plane D with the circumference of the pipe. The bolt axis B is also spaced above the base portion 18 and generally lies centrally between the top and bottom edges of the side walls 21 of the boss portion 19.

The base portion 18 is constructed and arranged so as to provide a bottom slightly concave force or pressure transmitting surface 29 and a flat planar strap-force directing surface 30 having a particular relationship to the bolt axis B as will be described hereinafter. It may be noted that the base portion 18 may be of any selected length and preferably its length corresponds to the width of strap 12 which encloses the base portion within its inturned loop 14. The cross-section of base portion 18 is uniform or non-changing throughout the length of the base portion. The cross-section of base portion 18 may resemble a relatively thick air foil section and may comprise a leading edge section 32, trailing edge section 33 and a medial or intermediate section 34 of greater thickness than the other of said sections. The leading section 32 provides a convex surface which smoothly merges with a top convex surface and a bottom slightly concave surface of the intermediate section 34. The trailing edge section 33 provides that flat strap flat directing surface 30 which merges with the top convex surface of the intermediate section, and section 33 also provides a slightly concave bottom surface smoothly merging with the bottom surface of the intermediate section 34. The trailing edge section 33 is thus provided with an elongated tapering section which lies between the pipe surface and the strap 12.

It is important to note that the flat planar surface 30 provided by the elongated trailing section 33 has a substantial portion thereof lying rearwardly of the back surfaces 23 of the boss portion 19 and that the plane of said surface 30 lies virtually tangent to the surface of pipe 10 at a tangent point spaced below the trailing edge 20 of the base portion. The tangent plane, indicated at T and defined by surface 30, when extended or projected upwardly intersects as at 35 the bolt axis at a point medial of the boss portion 19. The surface 20 thus determines the direction of force or stress which is imparted to the strap 12 when the bolt 16 is tightened.

The bottom pressure transmitting surface 29 includes a portion of the curvilinear bottom surface of the intermediate section 34 and may be defined as extending from the change of configuration at 29a at the joining of the convex leading edge surface with the beginning of the concave bottom surface of section 34 and extends rearwardly to a point at 29b spaced from the trailing edge 20. The bottom concave surfaces of the base portion 18 may generally conform to a curve having a radius corresponding to the radius of the outer surface of a pipe on which the clamp device is to be installed.

It will be noted that the strap end portions 14 conform to the surface configuration of the base portion 18 and that end margins 36 of the straps 12 lie between the pressure transmitting surface 29 and the adjacent pipe surface. Preferably, the length of the end margin 36 may correspond to the width of the surface 29 although it may extend further rearwardly if desired.

The selected configuration of the base portion 18, the location of the boss portion 19, and the bolt axis B defined thereby provide for a clamp member which uniformly distributes pressure forces over the pressure transmitting surface 29 so that a pipe repair device 11 utilizing clamp members 15 of this invention may be readily effectively installed with a minimum of crushing pressure transmitted through the clamp members to the pipe surface, such minimum of pressure transmitted including sufficient pressure to clamp and hold the end margins 36 of the band against movement between the clamp members and the pipe surface. Such improved result will be apparent to those skilled in the art upon analysis of the forces acting upon a clamp member 15 when bolt 16 is drawn tight. As mentioned above, the strap force directing surface 30 defines the direction of the strap force and the direction of such strap force intersects the bolt axis at 35. The bolt force acts along the axis of the bolt. When the bolt is drawn tight, a reaction force to the applied bolt force is transmitted to the clamp member along a plane F which intersects the axis of the pipe and the point of intersection 35 of the strap force with the bolt axis, such reaction force plane defining an angle beta with diametrical plane D. The angle beta for such a condition may be determined by the following formula:

$$B = \tan^{-1}\left(\frac{(1-\sin\alpha) - \frac{d}{R}\sin\alpha}{\left(\frac{d}{R}+1\right)\cos\alpha}\right)$$

where alpha is the angle between the tangent plane T and a vertical plane in this example, parallel to diametrical plane D. $d$ is the distance the bolt axis is spaced above the pipe surface at the intersection of diametrical plane D therewith, and R is the radius of pipe 10. Since the leading edge of a clamp member 15 is spaced a distance C from the diametrical plane D the width of the pressure transmitting surface 29 must be limited to have its center line of action agree with angle beta established by the conditions of the above equation. To further satisfy the requirement of minimum pressures transmitted by surface 29 the width of the pressure transmitting surface 29 may be determined by the following formula:

$$\frac{A}{R} = 2 \sin\left(B - \sin^{-1}\frac{C}{R}\right)$$

in which C is the distance between the diametrical plane and the leading edge of the clamp member and A (29a, 29b) is the width of the pressure transmitting surface 29.

It will thus be readily apparent that when the resultant force acting along the plane defined by the angle beta agrees with the center line of the pressure transmitting surface 29 there will be equal and uniform distribution of transmitting forces over surface 29. Thus when the bolt 16 draws a pair of clamp members toward each other, such uniform transmittal of pressure forces permits the clamp members to readily move relative to the pipe surface to draw the strap 12 tightly about the pipe. It will also be noted that any tendency of the clamp members to nose-over into the pipe surface will be prevented and restrained because of the defined direction of the strap force by the strap force directing surface 30 and such surface 30 resists tendency of the clamp member to turn about the leading edge which may act as a fulcrum or pivot. Thus, the clamp members 15 may be pulled together with sufficient force transmitted to the pipe to secure the end margins 36 of the strap between the clamp members and the pipe while at the same time moving relative to the pipe surface without imparting undesired concentrated pressure forces in extremely local or small areas thereon.

In addition to the force analysis described above, it should be readily noted that the intermediate section 34 is provided with a relatively thick section of metal so as to efficiently transmit and distribute pressure forces derived from the bolt tightening action. The loop 14 of the strap readily conforms to the surface configuration of the base portion 18. It should be noted that the strap diverges from tangent plane T in a smooth relatively gentle curve until a portion thereof lies almost perpendicular to plane T and then passes around the nose or leading edge of the base portion in a smooth relatively sharp curve of greater than 90°. As a result of this configuration and the uniform pressure distribution of pressure forces, the strap is securely held and although the bolt may be drawn very tight, stretching or deforming of the metal of the strap at the port through which the boss portion extends is prevented or reduced to a minimum and undesirable enlargement of the port is prevented.

Although the force analysis made above provides for uniform pressure distribution of forces acting on the pipe without physically defining the width of the pressure transmitting surface 29 (or A), such surface 29 may be defined on a clamp member by the location of band margin 36 or by providing an elongated recess or channel in the bottom surface of the section 34. Such recess may contain a pad of pressure transmitting material, the longitudinal center line of which coincides with the plane F. The pad may include a resilient yieldable material such as rubber compositions and synthetic compositions characterized by resistance to deterioration in the presence of soil and various fluids.

It will be readily apparent to those skilled in the art that some changes in configuration of the section of the base member may be required in order to provide a clamp member embodying this invention for pipe repair devices for use on pipe of greater or smaller diameter, but in each of such pipe devices the relationship between the strap force directing surface 20, the bolt axis B, the bottom pressure transmitting surface 29, and the bolt boss portion 19 will be as described hereinabove in order to provide minimum crushing pressure on the pipe and uniform distribution of such crushing pressure.

All such changes and modifications coming within the scope of the appended claims are embraced thereby.

I claim:

1. In a pipe clamp device for a pipe having a generally cylindrical external pipe surface, the combination of: a flexible strap having an inturned loop at each end; a clamp member retained within each loop and adapted to be juxtaposed opposite a mating clamp member; and a bolt adapted to interconnect mating clamp members; both of said clamp members including identical elongated base portions, each base portion having front and back longitudinal edges and having a transverse cross-section including an intermediate thick section having maximum depth, a front section of reduced depth, and a contiguous relatively long back section tapering from said thick section to a thin section at the back edge of the base portion; an upstanding boss portion integral with said front reduced and intermediate thick sections and provided with a back face, said boss portion having an opening to receive and position said bolt along a transverse axis when said mating clamp members are interconnected thereby; said back tapered section of each base portion providing a longitudinally extending upper planar surface between the back face of the boss portion and the back edge of the base portion, said surface serving to locate that portion of said strap overlying said planar surface in a strap plane which, when projected, intersects said bolt axis between said front edge of the base portion and the back face of said boss portion; and a bottom surface on each base portion curved to generally correspond with the curvature of the cylindrical pipe surface.

2. A pipe clamp device as stated in claim 1 wherein said bottom surface includes a bottom pressure transmitting surface portion in spaced relation to said front edge of the base portion and symmetrical with respect to a diametrical plane of said pipe, said diametrical plane passing through the intersection of the strap plane with said bolt axis.

3. In a pipe clamp device for a pipe having a generally cylindrical external pipe surface, the combination of: a flexible strap having an inturned loop at each end; a clamp member retained within each loop and adapted to be juxtaposed opposite a mating clamp member; and a bolt adapted to interconnect mating clamp members; both of said clamp members including identical elongated base portions having leading and trailing edges and having thick air foil-like configurations including curved bottom surfaces corresponding generally to the curvature of said cylindrical pipe, upper convexly curved surfaces smoothly merging with said bottom surfaces at said leading edges and spaced a maximum distance from said bottom surfaces forwardly of the longitudinal center lines of said base portions, and planar surfaces merging with said upper convex surfaces and defining with said bottom surfaces, elongated tapered sections terminating in relatively thin trailing edges; upstanding boss portions integral with said base portions at said convex surfaces on said base portions, said boss portions having back faces to seat said bolt and having openings to position the axis of said bolt, said back faces of said boss portions being disposed in planes intersecting said base portions adjacent the mergence of said planar surfaces and said convex surfaces; said planar surfaces when projected defining planes intersecting said bolt axis between said back faces and leading edges of said base portions, whereby said elongated tapered sections act against overlying strap portions to restrain said clamp members from turning in a direction toward said pipe surface for permitting said clamp members to be drawn smoothly and uniformly towards each other upon tightening of said bolt.

4. A pipe clamp device as stated in claim 3 wherein the planes of said planar surfaces when projected intersect said bolt axis medially of said boss portions.

5. A pipe clamp device as stated in claim 3 wherein the width of said tapered sections of said base portions is approximately the width of the remainder of said base portions defined by said convex surfaces and bottom surfaces.

References Cited in the file of this patent

UNITED STATES PATENTS

| | | |
|---|---|---|
| 2,213,022 | Stauffer | Aug. 27, 1940 |
| 2,278,714 | Stauffer | Aug. 7, 1942 |
| 2,601,420 | Stackhouse | June 24, 1952 |